United States Patent [19]

Bolton

[11] Patent Number: 4,697,625
[45] Date of Patent: Oct. 6, 1987

[54] STUMP TRIMMER

[76] Inventor: John D'Arcy Bolton, 5 Shiloh Cir., Irvine, Calif. 92714

[21] Appl. No.: 859,912

[22] Filed: May 5, 1986

[51] Int. Cl.⁴ ............................................. A01G 23/06
[52] U.S. Cl. .................................................. 144/2 N
[58] Field of Search ................ 144/2 N; 56/13.6, 16.9

[56] References Cited

U.S. PATENT DOCUMENTS

| | | | |
|---|---|---|---|
| 3,618,304 | 11/1971 | Hundhausen | 56/16.9 |
| 3,783,914 | 1/1974 | Daugherty et al. | 144/2 N |
| 4,402,352 | 9/1983 | Hodges | 144/2 N |
| 4,446,679 | 5/1984 | Thomas | 56/16.9 |

FOREIGN PATENT DOCUMENTS 2108903  5/1983  United Kingdom ............... 144/2 N Primary Examiner—Robert L. Spruill

[57] ABSTRACT

The apparatus consists of a shaft in vertical position, the upper portion attached to blade mounting pad under the engine of a power lawn mower. At the lowest end there is a circular disk with cutting teeth around the periphery. The cutting disk is suspended below the power lawn mower by the length of the shaft and with the mower in normal operating position the cutting disk is below ground level. When the mower with engine operating is pushed over a tree stump, the cutting disk is forced into the stump below ground level and cuts it off.

1 Claim, 1 Drawing Figure

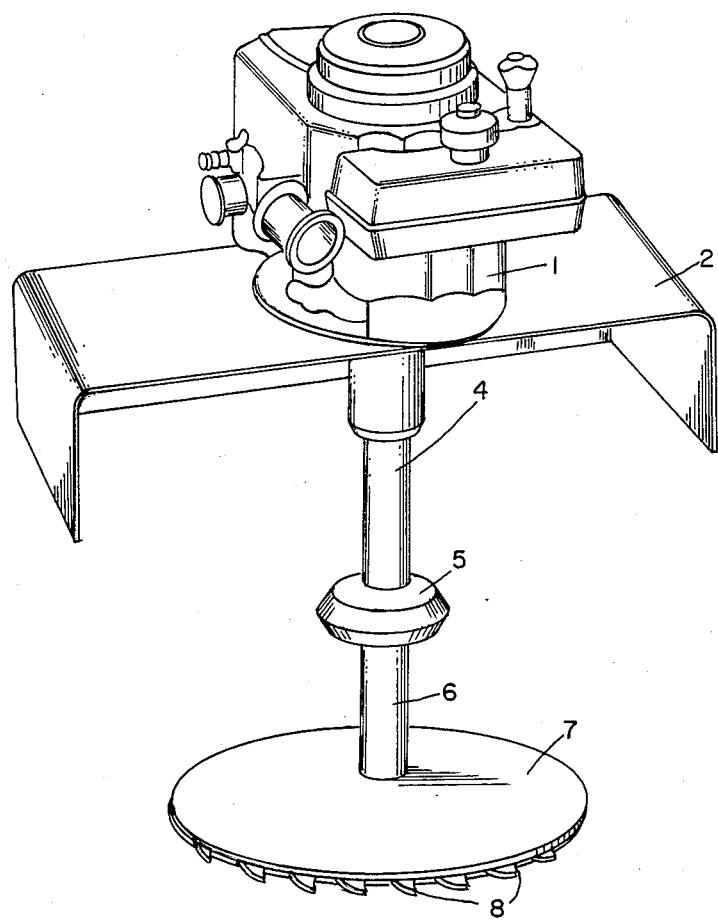

STUMP TRIMMER

FEDERAL RESEARCH RIGHTS

The Federal Government made no contribution to the research and/or development of this invention and has no rights in the invention or the patent.

FIELD OF THE INVENTION

This apparatus relates to wood cutting devices and more particularly to a device to trim tree stumps off below ground level.

DESCRIPTION OF THE PRIOR ART

After a tree is cut and removed a tree stump remains. The shortest a tree can be cut above the ground with a chain saw is about 4". That leaves a stump projecting above the ground that is unsightly and is dangerous for pedestrians. At the present state of the art stumps can be very laboriously dug out or they can be chipped down by a chipping tool that is very expensive to either buy or rent and very hard to use.

SUMMARY OF THE INVENTION

The apparatus consists of a shaft in vertical position, the upper portion attached to a blade mounting pad under the engine of a power lawn mower. At the lowest end there is a circular disk with cutting teeth around the periphery. The cutting disk is suspended below the power lawn mower by the length of the shaft and with the mower in normal operating position the cutting disk is below ground level. When the mower with engine operating is pushed over a tree stump, the cutting disk is forced into the stump below ground level and cuts it off.

BRIEF DESCRIPTION OF THE DRAWINGS

In the drawing FIG. 1 is diagrammatic cut away view of the apparatus.

DESCRIPTION OF THE PREFERRED EMBODIMENT

In describing one selected embodiment of my invention illustrated in the drawing, specific terminology is resorted to for the sake of clarity; however, it is not intended to be limited to the specific terms so selected and it is to be understood that each specific term includes all technical equivalents which operate in a similar manner to accomplish a similar purpose.

The invention is an attachment to a device commonly known as a power lawn mower consisting of an electric motor or internal combustion engine driving a downward projecting shaft. On the end of said shaft there is a propeller shaped blade with sharpened edges intended to cut grass as it turns. There is a cover to house the cutting blade and support the engine. There are wheels on the cover to allow the whole apparatus to be propelled forward and there is a convenient handle. The above described combination is designated "power lawn mower" for purposes of this application.

The invented device replaces the cutting blade and attaches to the power lawn mower at the place where the cutting blade was previously attached. The new combinatioon of rotary cutting blade and power lawn mower comprises the invention described herein, "stump trimmer".

Turning now to the specific embodiment of my invention selected for illustration in FIG. 1, numbers 1 through 4 are a power lawn mower consisting of engine, 1, blade housing cover 2, engine power shaft 3, mounting plate for blade, 5. The stump trimmer consists of a shaft 6 attached to a cutting disk 7, said cutting disk with teeth 8.

OPERATION OF THE APPARATUS

The user attaches the shaft to the power lawn mower blade mounting pad with the shaft and cutting wheel projecting down below the whole apparatus. He removes some soil around the base of the stump to be trimmed off and places the power lawn mower over the hole with the cutting wheel in the hiole near the stump. He starts the power lawn mower engine and pushes the mower forward. That action forces the cutting wheel against the stump and the teeth on the cutting disk cut the stump off below the ground level.

It is to be understood that the form of my invention selected for illustration here and described herein is to be taken as a preferred embodiment. For example equivalent elements may be substituted for those illustrated and described; any kind or sort of shaft, mounting mechanism or cutting plate may be used.

An advantage of my invention is that it offers an inexpensive apparatus to cut off tree stumps below ground level. Another advantage is that the whole mechanism in operation is covered by the power lawn mower canopy and the user is relatively safe from flying debris.

Having thus described and disclosed by invention I claim:

1. An apparatus for severing tree stumps below ground level comprising in combination:

a power lawn mower, including a canopy, a motor, mounted on said canopy, a rotatable drive shaft directly driven by said motor, a blade mounting plate fixedly attached to an end of said drive shaft, and a cutter means including a shaft, means detachably mounting an end of said shaft to said blade mounting plate of said power lawn mower, a circular disk fixedly mounted to another end of said shaft, said disk having a plurality of cutting teeth attached to the periphery of said circular disk, whereby rotation of said drive shaft driven by said motor causes said disk to rotate so that when said lawn mower is placed over a hole adjacent a tree stump and propelled toward the stump said teeth on said disk severs the stump below ground level.

* * * * *